US008489676B1

(12) United States Patent
Chaplin et al.

(10) Patent No.: US 8,489,676 B1
(45) Date of Patent: Jul. 16, 2013

(54) TECHNIQUE FOR IMPLEMENTING SEAMLESS SHORTCUTS IN SHAREPOINT

(75) Inventors: Andrew Chaplin, Reading (GB); Andrew Gilbert, Downley (GB)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/827,945

(22) Filed: Jun. 30, 2010

(51) Int. Cl.
*G06F 15/16* (2006.01)

(52) U.S. Cl.
USPC ........... 709/203; 709/201; 709/202; 709/231; 709/245

(58) Field of Classification Search
USPC .......................... 709/203, 201, 202, 231, 245
See application file for complete search history.

(56) References Cited

U.S. PATENT DOCUMENTS

| | | | |
|---|---|---|---|
| 5,150,473 A * | 9/1992 | Zulch | 711/162 |
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,835,953 A | 11/1998 | Ohran | |
| 5,991,542 A | 11/1999 | Han et al. | |
| 6,029,168 A | 2/2000 | Frey | |
| 6,085,298 A | 7/2000 | Ohran | |
| 6,101,585 A | 8/2000 | Brown et al. | |
| 6,360,330 B1 | 3/2002 | Mutalik et al. | |
| 6,366,987 B1 | 4/2002 | Tzelnic et al. | |
| 6,542,962 B2 | 4/2003 | Kodama et al. | |
| 6,640,278 B1 | 10/2003 | Nolan et al. | |
| 6,665,815 B1 | 12/2003 | Goldstein et al. | |
| 6,714,952 B2 | 3/2004 | Dunham et al. | |
| 6,829,688 B2 | 12/2004 | Grubbs et al. | |
| 6,847,983 B2 | 1/2005 | Somalwar et al. | |
| 6,865,655 B1 | 3/2005 | Andersen | |
| 6,880,051 B2 | 4/2005 | Timpanaro-Perrotta | |
| 6,910,112 B2 | 6/2005 | Berkowitz et al. | |

(Continued)

FOREIGN PATENT DOCUMENTS

EP 838758 4/1998

OTHER PUBLICATIONS

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).
"Repliweb R-1 User Guide—Version 3.1," RepliWeb, Inc., 2002, (27 pages).
"FilesX Xchange RestoreTM for Microsoft Exchange Server," FilesX, Inc., Aug. 2003, (2 pages).

(Continued)

*Primary Examiner* — Lan-Dai T Truong
(74) *Attorney, Agent, or Firm* — Rory D. Rankin; Meyertons, Hood, Kivlin, Kowert & Goetzel, P.C.

(57) ABSTRACT

A system and method for creating shortcuts within a database for archived items. A client computer sends a retrieval request for a given item to a web server. The given item may be an electronic document. A custom HTTPModule within the web server intercepts the request. The HTTPModule uses a uniform resource locator (URL) provided in the request to locate a record associated with the given item. If a given fixed string value is read from the record in place of the original content data, then the web server requests original content data for the given item from an archive store. The record still maintains identification information, such as a document identifier and the URL in order to maintain links and workflows. The retrieval request is not rerouted to an alternate path, and the client computer receives the original content data, rather than an indication of a shortcut.

19 Claims, 6 Drawing Sheets

U.S. PATENT DOCUMENTS

| | | | |
|---|---|---|---|
| 6,938,135 | B1 | 8/2005 | Kekre et al. |
| 6,976,039 | B2 | 12/2005 | Chefalas et al. |
| 7,149,858 | B1 | 12/2006 | Kiselev |
| 7,290,017 | B1 | 10/2007 | Wang et al. |
| 7,290,101 | B1 | 10/2007 | Kekre et al. |
| 7,389,314 | B2 | 6/2008 | Kulkarni et al. |
| 7,549,032 | B1 | 6/2009 | Kekre et al. |
| 7,596,713 | B2 | 9/2009 | Mani-Meitav et al. |
| 7,617,414 | B2 | 11/2009 | Becker et al. |
| 7,672,934 | B1 | 3/2010 | Beatty et al. |
| 2003/0163495 | A1 | 8/2003 | Lanzatella et al. |
| 2003/0167355 | A1* | 9/2003 | Smith et al. .................. 709/328 |
| 2003/0177149 | A1 | 9/2003 | Coombs |
| 2004/0243928 | A1 | 12/2004 | Hesmer et al. |
| 2004/0267839 | A1 | 12/2004 | Mendonca et al. |
| 2004/0268068 | A1 | 12/2004 | Curran |
| 2005/0138087 | A1 | 6/2005 | Beck et al. |
| 2006/0041556 | A1 | 2/2006 | Taniguchi et al. |
| 2006/0230116 | A1 | 10/2006 | Couper et al. |
| 2007/0067304 | A1* | 3/2007 | Ives ............................... 707/10 |
| 2007/0266044 | A1* | 11/2007 | Grondin et al. ............... 707/102 |
| 2008/0307000 | A1 | 12/2008 | Paterson et al. |
| 2011/0078833 | A1* | 3/2011 | Wu et al. ...................... 800/312 |
| 2011/0087733 | A1* | 4/2011 | Shribman et al. ............. 709/204 |

OTHER PUBLICATIONS

"Instructor Articles," VERITAS Education, pp. 1-7, Apr. 2003.
"EMC TimeFinder Family," EMC Corporation, 8 pages, Oct. 2004.
"EMC TimeFinder Local Replication," EMC Corporation, 2 pages, Oct. 2004.
"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.
"Storage Management -Best Practices", Copyright 2001, IBM Corp., ftp://ftp.software.ibm.com/software/tivoli/whitepapers/wp-storage-bp.pdf, (2001), 11 pages.
Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.
Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

* cited by examiner

TECHNIQUE FOR IMPLEMENTING SEAMLESS SHORTCUTS IN SHAREPOINT

BACKGROUND OF THE INVENTION

1. Field of the Invention

This invention relates to the field of data store management and, more particularly, to creating placeholders within a database for archived data used to return the archived original data during requests.

2. Description of the Related Art

As computer memory storage and data bandwidth increase, so does the amount and complexity of data that business and industry daily manage. A large portion of the data that may be managed in an enterprise involves content managed for a company or workgroup by a dedicated server, such as an enterprise information portal, which provides employees and customers the ability to search and access corporate information. Such information may include electronic documents, announcements, task, discussion topic, etc., that may be organized as lists of items. The enterprise information portal may serve as the gateway to log into the corporate network and retrieve electronic documents. It is noted that enterprise information portals are typically secure and private (also known as intranet portals), but also may include external gateways for wider or even public access.

An enterprise information portal often includes a back-end database system, which may serve as a document management system. The back-end database system may store data in the form of records comprising links to electronic documents, metadata, and/or other content associated with the portal, such as web pages. The back-end database in an enterprise information portal may in some cases be a variant of a stand-alone database system, which has been configured for document and content management.

When the original content data for an item, such as an electronic document, is sent from the information enterprise portal to an archive store, a corresponding record may be updated within the portal to act as a placeholder for the item. The placeholder may be referred to as a shortcut. To create a shortcut, current mechanisms replace the item with an aspx file or an html file that redirects a Web browser to the archived item. A problem with this solution is it does not preserve the URL of the item. In addition, an internal identifier utilized within the information enterprise portal is removed or replaced. Accordingly, links to the item no longer function and any workflows dependent on the links are broken. Further, an end user may not be able to edit the item that has been replaced by a shortcut and expect the changes to be saved back to the information enterprise portal.

In view of the above, improved systems and methods for creating placeholders for archived data that returns the archived original data are desired.

SUMMARY OF THE INVENTION

Systems and methods for creating placeholders within a database for archived items used to return the archived original data for the item during retrieval requests are contemplated.

In one embodiment, a computer system includes a web server that receives a request for a given item from a browser on a client computer. In one embodiment, the given item is an electronic document. The request may be a HTTP request. In one embodiment, a custom HTTPModule may be added to an intranet portal application running on the web server. The custom HTTPModule may intercept the HTTP request which may include a location identifier for the given item. In one embodiment, the location identifier is a uniform resource locator (URL) value. Using the URL, the custom HTTPModule within the web server identifies a record within a table of one or more tables used to describe a web site. Within the record, the custom HTTPModule reads a field value corresponding to stored content data associated with the given item. If the stored content data matches a given fixed string value, then the record corresponds to a placeholder, or a shortcut, for the given item. In one embodiment, the fixed string value is "shortcut". Detecting the record corresponds to a shortcut indicates the original content data for the given item is stored in an archive store and the content data is not stored within the web server. However, the record still maintains identification information corresponding to the given item, such as a document identifier, the URL, a filename, a file extension, and other identifiers in order to maintain links and workflows. The links and workflows may be defined within an intranet portal application, such as the Microsoft® SharePoint® Server program.

When the web server detects a shortcut, the web server may be configured to read archival information from the record. The archival information may have been stored within the record at the time the original content data was sent to an archive store. The archival information may include identification information used by a server and the archive store to locate an archived copy of the original content data. The web server may send a request with the archival information to the archive store to retrieve the archived copy. The original content data may be returned in a HttpResponse stream to the requesting browser in the client computer. Therefore, an application that sends a request that results in accessing a shortcut within the intranet portal application may receive the original document content. The application does not receive an indication of a shortcut. In addition, the request is not rerouted to an alternate path, such as a different URL. It may appear to the application that the original document is still in place.

These and other embodiments will be appreciated upon reference to the following description and accompanying drawings.

Figure 1:
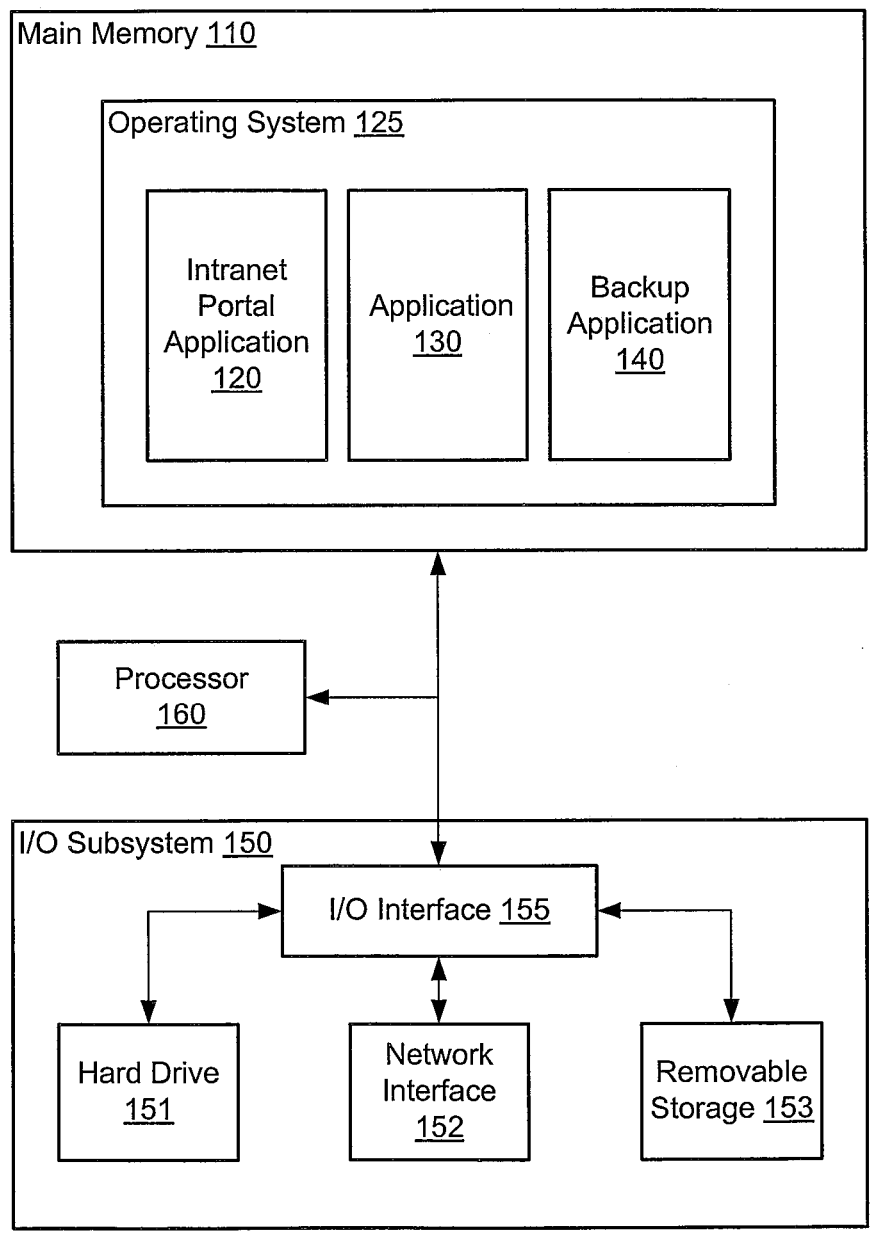
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a computer system 100 is shown. Computer system 100 includes a processor 160 coupled to a main memory 110. Processor 160 and main memory 110 are in turn connected to an I/O subsystem 150, which comprises an I/O interface 155, a hard disk drive 151, a network interface 152, and a removable storage 153. Computer system 100 may be representative of a laptop, desktop, server, workstation, terminal, personal digital assistant (PDA) or any other type of computer system. In one embodiment, computer system 100 is representative of any number of servers hosting business-critical applications and database servers.

I/O interface 150 is operational to transfer data between processor 160 and/or main memory 110 and one or more internal or external components such as hard disk drive 151, network interface 152 and removable storage 153, as desired. For example, I/O interface 155 may embody a PCI bridge operable to transfer data from processor 160 and/or main memory 120 to one or more PCI devices. I/O interface 155 may additionally or alternatively provide an interface to devices of other types, such as SCSI devices and/or Fibre channel devices.

Hard disk drive 151 may be a non-volatile memory such as a magnetic media. Network interface 155 may be any type of network adapter, such as Ethernet, fiber optic, or coaxial adapters. Removable storage 153 is representative of a disk drive, optical media drive, tape drive, or other type of storage media, as desired.

In addition to the depicted hardware components, computer system 100 may additionally include various software components. For example, FIG. 1 illustrates an operating system 125 stored in main memory 110. Operating system 125 is representative of any of a variety of specific operating systems. For example, operating system 125 may include Microsoft® Windows® operating system, Microsoft Windows Server® 2008 R2, UNIX®, Linux®, Solaris®, or any other operating system. As such, operating system 125 may be operable to provide various services to the end user and provide a software framework operable to support the execution of various programs such as an Intranet Portal application 120, a backup application 140 or any of a variety of other applications represented in the illustrated embodiment by application 130. It is noted that the depicted software components of FIG. 1 may be paged in and out of main memory 120 in a conventional manner from a storage medium such as hard drive 151.

In various embodiments, intranet portal application 120 is operable to manage and maintain a plurality of web pages and electronic documents for a plurality of system users. In one particular implementation, a Microsoft® SharePoint® Server or a similar enterprise information portal program embodies intranet portal application 120. In one embodiment, intranet portal application 120 comprises web site development software, which supports different types of web sites through the use of a template based architecture.

In one embodiment, an organization utilizes an intranet. As is well known, an intranet is a private computer network within the organization. The intranet may use Internet Protocol (IP) technologies to securely share any part of the organization's information within that organization. The intranet may utilize similar technologies used for the Internet, such as client-server computing and the Internet Protocol Suite (TCP/IP). The intranet may host multiple private websites. The information for an Intranet website may be stored in tables and records of a database. One or more users may provide further changes to a deployed web site definition by adding, deleting, and modifying information stored in corresponding tables and records.

In the illustrated embodiment, intranet portal 120 may include an encapsulated version of a database (not shown) for storing tables, records, lists and items. In one embodiment, intranet portal 120 may be configured to be the 'user' of a database. In one embodiment, a Microsoft® SQL server, a Microsoft® Sharepoint® server, or other database server system embodies a database. It is further noted that one or more client computers may be coupled via a network to computer system 100 allowing the client systems to access the intranet portal 120 centrally via one or more web pages, including access to the database.

A database may represent both a database program and/or one or more actual databases implemented therein (not shown in FIG. 1). The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records, also referred to as records or entries, that constitute the "database."

In one embodiment in which the database is a relational database, the records may be arranged in tables (row and column arrangement). The term "record" as used herein shall refer to an entry in a database. A collection of associated records may be collectively described as a "table" in the database. A record may consist of one or more fields. Each field is a column in a corresponding table. Each column is a set of data values of a particular type, one for each row of the table.

A field value may refer specifically to a given value that exists at an intersection between one row and one column. For example, if an item is a document, then examples of the field values within a corresponding record may include a unique identifier for the document, a unique identifier of a web site to which the document belongs, a unique identifier of a list with which the document is associated, a version number of the document, properties specified for per user basis, a uniform resource locator (URL) value of a web page to which a corresponding record refers, a date and time the document was created or modified, a size of the document, corresponding metadata in a binary field, content of the document in a binary field, and so forth.

One or more fields within a record may serve as indexes (or keys) to other records in other tables. For example, in a document management database, each record in a document table may represent a document (or data object) stored in the database. In one embodiment, the document (data object) may be stored in one or more fields of the record itself. In some embodiments, the document (data object) may be represented in a record by a reference to the document, such as a memory location. In addition, the database may create and modify a mounted database file (not shown in FIG. 1) for storing and accessing any given implementation of a relational database. In some embodiments, the database executes on a dedicated computing system, such as computer system 100, that is configured for access by other server and client computers via a communications network.

The database may include various kinds of functions associated with a relational database, such as add, query, and store procedures. The query function may retrieve information from the database, such as newly generated identifier and link values, which is further described later. The add function and store procedures may store information in the database. In one embodiment, interfaces used to provide access to the database may use SQL (Structured Query Language).

Figure 2:
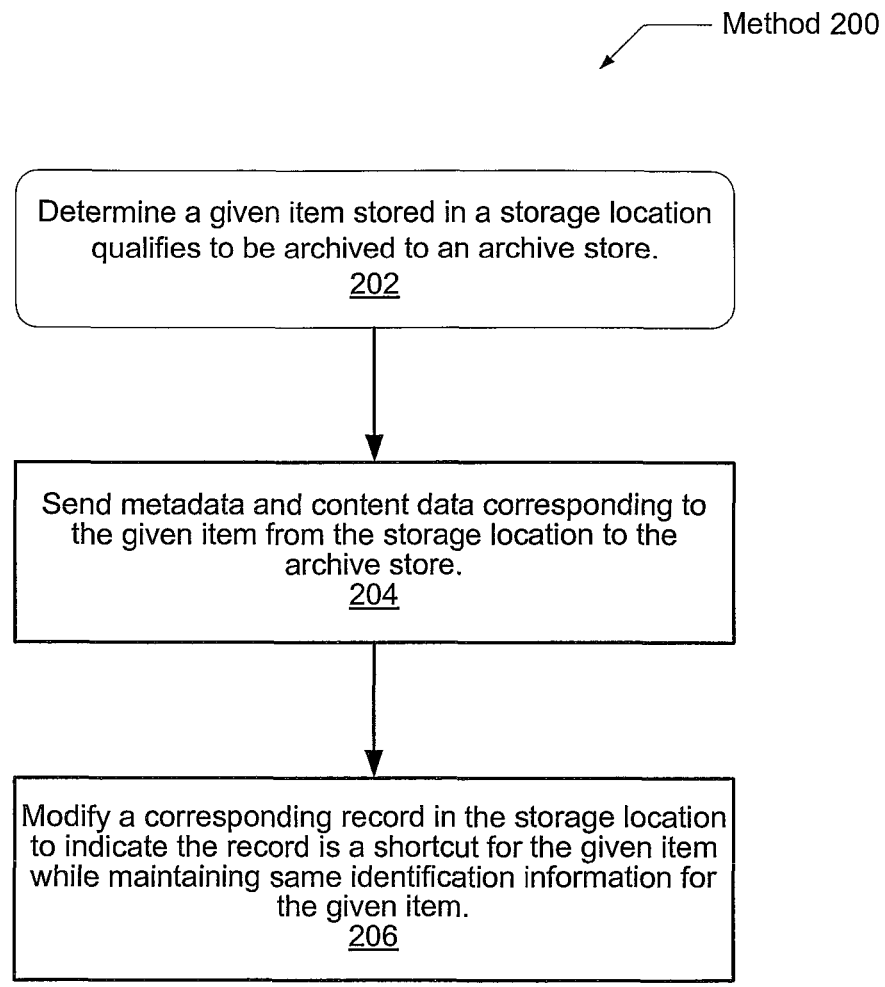
FIG. 2 is a flow diagram illustrating one embodiment of a method for creating a shortcut for an archived item.

Referring to FIG. 2, an overview of one embodiment of a method 200 for creating a shortcut for an archived item is shown. For purposes of discussion, the data is described as corresponding to a website. However, the methods and mechanisms described herein are applicable to other, non-website, data as well. The components embodied in the computer system 100 described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 202, it is determined a given item stored in a storage location qualifies to be archived to an archive store. In one embodiment, the given item may be a document. In one embodiment, the backup application 140 may perform the determination when an item qualifies to be archived. The backup application 140 may communicate with the intranet portal application 120 when such a determination is made. In another embodiment, the intranet portal application 120 may comprise an archiving agent that performs the determination when an item qualifies to be archived.

Archiving an item may include moving an item from a storage location, such as within intranet portal application 120, to an archive store. In one embodiment, an archive store may be disk storage coupled to a backup server. Both the intranet portal application 120 and the backup application 140 may communicate with the backup server via I/O interface 155 and network interface 152. The intranet portal application 120 or the backup application 140 may base the archive qualification of an item on a corresponding age, a usage factor, a size, a combination of these characteristics, or a combination of other corresponding characteristics.

In block 204, metadata and content data corresponding to the given item may be sent from the storage location to the archive store. The metadata may be used at a later time to identify the given item stored within the archive store. In block 206, the intranet portal application 120 may modify a record corresponding to the given item. The record may be stored in the storage location, such as memory medium 110. The modification may both indicate the record is a shortcut for the given item and maintain the same identification information for the given item. Particular fields within the record may be modified to indicate the record is a shortcut. In addition, other particular fields may not be modified in order to maintain the same identification information for the given item. A further description is provided below.

Regarding the record being a shortcut indication for the given item being archived, the record may no longer comprise any content data stored in the storage location. Rather, the content data may now be stored in the archive store. In one embodiment, a fixed string may be stored in the field value corresponding to the content data. For example, a fixed string value of "stub", "shortcut", or other may be stored in place of the content data. The field for the data size may be changed from a size of the content data to a new value corresponding to a size of the fixed string.

In addition, archival information may be stored in the record. The archival information may correspond to a portion or all of the archival identification information used by the backup server and the archive store to locate the given item in the archive store. For example, an archival identifier and a saveset identifier (SSID) utilized for the archiving of the given item may be stored in the corresponding record.

It is noted that the stored archival information described above may not be sufficient to determine the corresponding record stores a shortcut rather than content data. The stored archival information may not be reset when the given item is later updated, such as being edited and saved. Therefore, the stored archival information does not indicate whether the record stores a shortcut or the content data. In an alternative embodiment, document save events may be trapped and used to reset or to remove the archival information stored in the field for custom properties. In this embodiment, for a later retrieval request, the field used to store the archival information may be used to determine whether the corresponding record stores a shortcut or the content data.

In another embodiment, the archival information may be stored along with the fixed string described above in place of the content data. The choice of a location within the record to store the archival information may be based on an ease of later extracting the archival information for a retrieval request and the steps used to determine whether the record stores a shortcut.

Regarding the record maintaining the same identification information for the given item being archived, the record may continue to store identification values in particular fields. For example, the record may maintain the unique identifier for the item, the item name, the URL, and the other unique identifier values for a list and a web site. A Hyper Text Markup Language (HTML) file or an aspx (.NET web form) file does not replace the metadata, the URL or the content data within the corresponding record.

Figure 3:
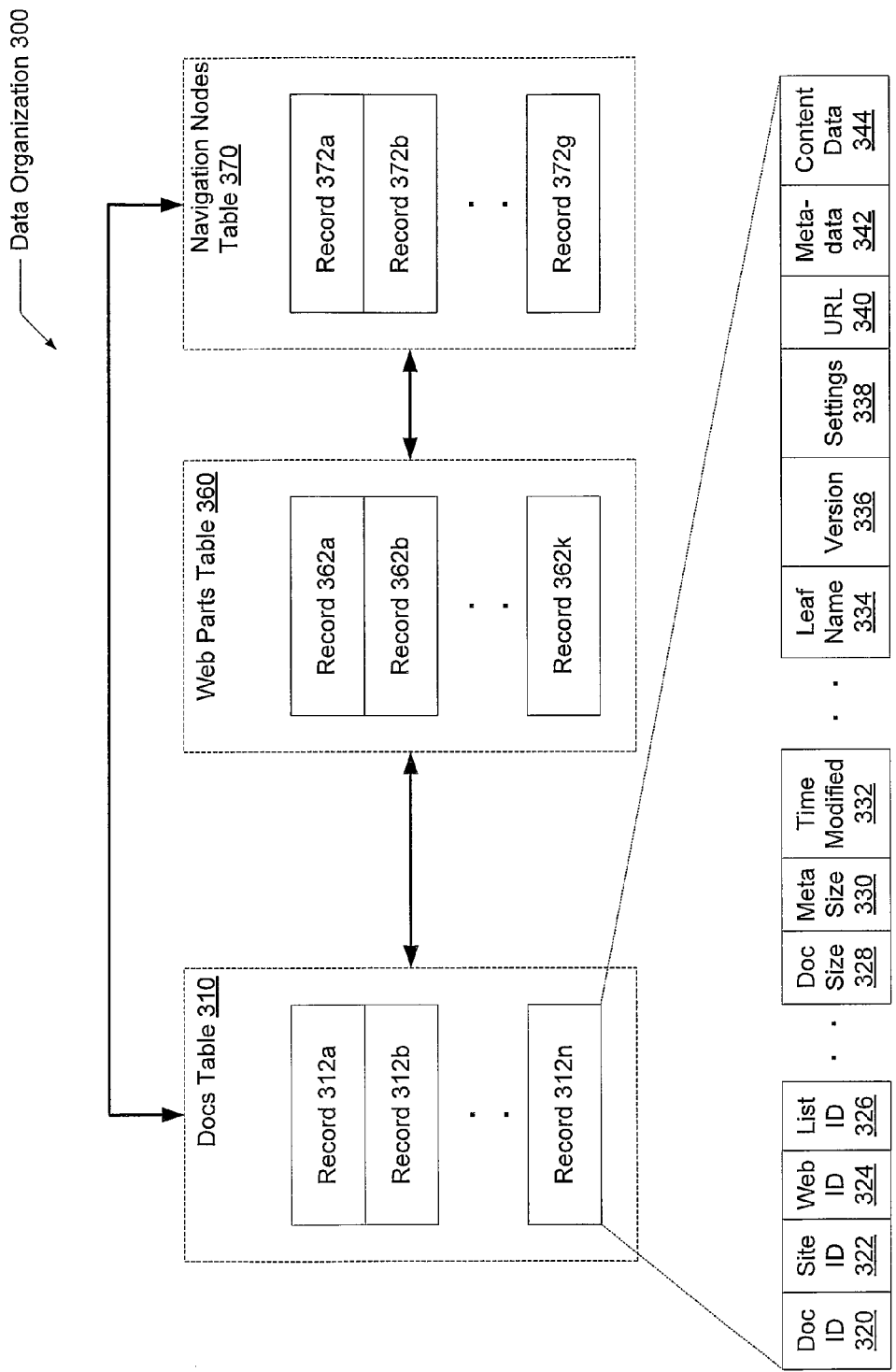
FIG. 3 is a generalized block diagram illustrating one embodiment of data organization within a database system.

Referring to FIG. 3, a generalized block diagram illustrating one embodiment of data organization 300 within a database system is shown. The database system may store data in the form of records comprising links to electronic documents, metadata, and/or other content associated with a portal, such as web pages. The database, which may be comprised within an enterprise information portal, may be configured for document and content management. The data organization 300 may comprise one or more tables. In the embodiment shown, a Docs table 310 is coupled to a Web Parts table 360. Each of tables 310 and 360 is coupled to a Navigation Nodes table 370. Each table comprises one or more records. For example, the Docs table 310 includes records 312a-312n, the Web Parts table 360 includes records 362a-362k, and the Navigation Nodes table 370 includes records 372a-372g. The top level of the hierarchy may correspond to the Docs table 310 and the bottom level may correspond to both a Navigation Nodes table 370 and a Lists table (not shown). The middle level may correspond to the Web Parts table 360. In this web site example, there are only three levels of hierarchy, but other numbers of levels are possible and contemplated.

As described earlier, a record may consist of one or more fields. Each field is a column in a corresponding table. Each column is a set of data values of a particular type, one for each row of the table. A field value may refer specifically to a given value that exists at an intersection between one row and one column. In one example, a first web page may correspond to a record within the Docs table 310. One record of records 312a-312n may hold information corresponding to the first web page. For this example, record 312b may hold the corresponding information. One or more index values, such as a Web Parts identifier (ID), may be stored within the fields of record 312b. These index values may identify one or more records of records 362a-362k within the Web Parts table 360. The data stored in the identified one or more records within the Web Parts table 360 may provide a look and feel for the first web page.

A link to an electronic document may be included within the first web page. In one embodiment, the electronic document may be a frequently asked questions (FAQ) document corresponding to the first web page. A stored index value within one of the one or more identified records of records 362a-362k may identify a record within the Navigation Nodes table 370. The identified record of the records 372a-372g within the Navigation Nodes table may store a URL value corresponding to the FAQ document. Generally speaking, an entry, or record, in the Navigation Nodes table 370 may point to a destination (e.g., web page) outside of the intranet portal application, such as www.yahoo.com, www.google.com, and so forth. These web pages are not defined within a private intranet portal application. Otherwise, the record within the Navigation Nodes table 370 may point to a web page defined within the intranet portal application. This web page may have an entry within the Docs table 310 supported by the intranet portal application and have a corresponding Docs GUID. The URL value or another identifier stored within the identified record within table 370 may be used to index a record within the Docs table 310. In this example, record 312n may be the identified record corresponding to the FAQ document.

The identified record 312n may hold a document identifier within field 320. This identifier may be a globally unique identifier (GUID) value. The field 322 may hold a GUID corresponding to a web site that includes the FAQ document. The field 324 may store a GUID corresponding to a subsite that includes the FAQ document. This GUID value may be used to index the Web Parts table 360 in order to provide a look and feel for a FAQ web page. The field 326 may hold a GUID for a list with which the FAQ document is associated. One or more other identifiers may be stored within record 312n that are not shown. For example, an identifier of a user who last checked out the FAQ document for updates or revisions may be stored within record 312n.

The fields 328 and 330 may hold a size of the FAQ document and a size of corresponding metadata in a given measure of units. For example, a measure of kilobytes may be used. The field 332 may hold information corresponding to a date and a time the FAQ document was last modified. Other information not shown may be stored within record 312n, such as a checkout time and a checkout size of the FAQ document. The fields 334 and 336 may hold a name of the FAQ document and a version number of the FAQ document, respectively. The field 338 may hold various status and settings information for the FAQ document. For example, the setting of particular flag values within the field 338 may determine whether directory names and URL values are relative or absolute values, whether the FAQ document is checked out, and so forth.

Continuing with the example above, the field 340 may hold a URL value corresponding to the FAQ document. This URL value may be used to determine record 312n corresponds to the FAQ document and the URL found earlier in the Navigation Nodes table 370. The fields 342 and 344 may hold the metadata and the content data corresponding to the FAQ document. In one embodiment, fields 342 and 344 may store the metadata and the content data in binary fields.

When the FAQ document is archived, at least the document size field 328 and the content data field 344 may be modified to indicate record 312n is now a shortcut. For example, after an archived copy of the FAQ document is created in an archive store, the content data field 344 may be overwritten with a fixed string, such as "stub", "shortcut", or other. The data size field 328 may be updated with the size of the fixed string. Although the fields 320-344 are shown in a particular order, other combinations are possible and other or additional fields may be utilized as well. The bits storing information for the fields 320-344 may or may not be contiguous.

Figure 4:
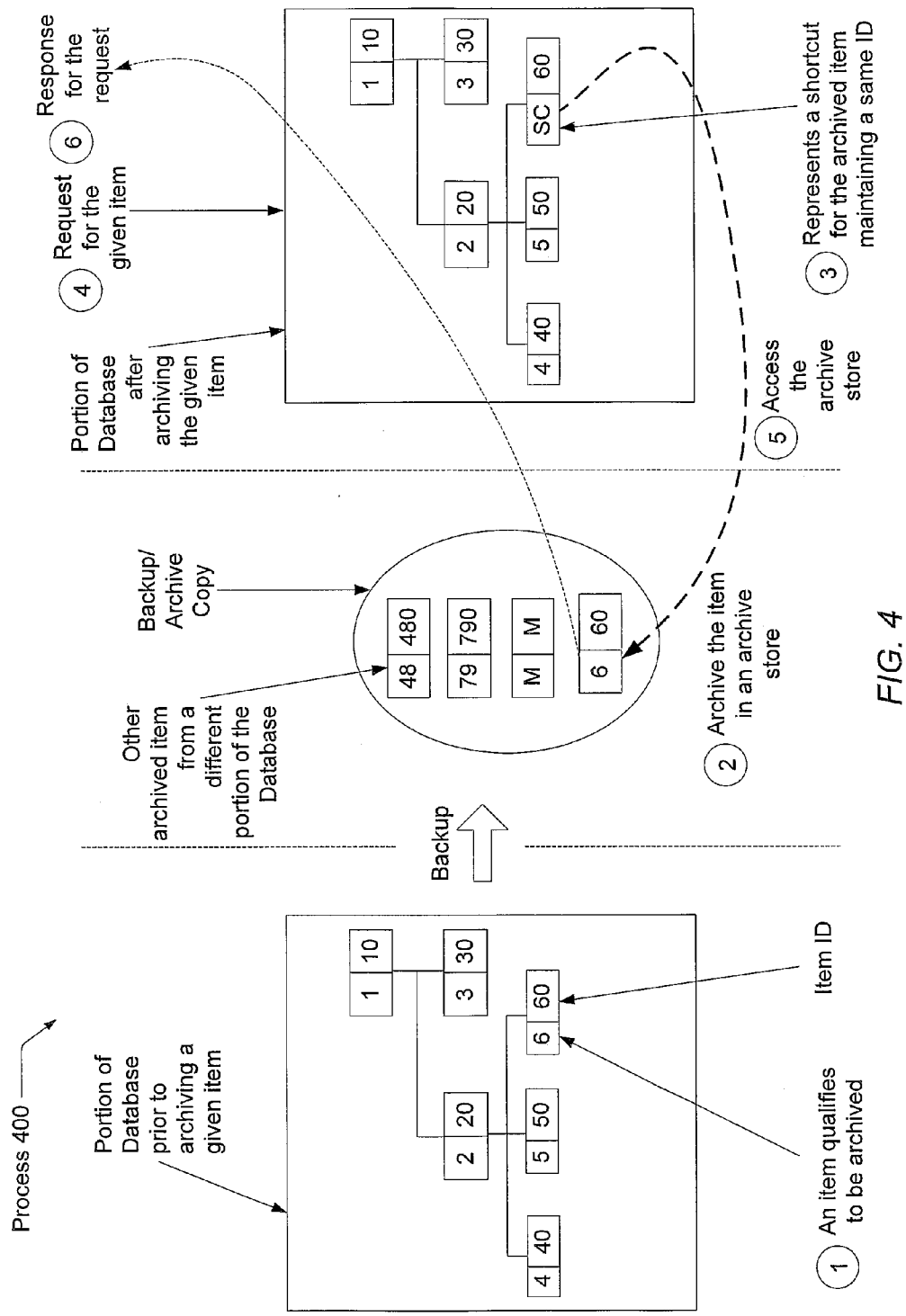
FIG. 4 is a generalized block diagram illustrating one embodiment of a process for archiving and retrieving a given item utilizing a shortcut.

Turning now to FIG. 4, a generalized block diagram illustrating one embodiment of a process 400 for archiving and retrieving a given item is shown. Again, for purposes of discussion, the data is described as corresponding to a document within a website. However, the methods and mechanisms described herein are applicable to other, non-website, data as well. As can be seen, a portion of a database includes blocks 1-6, each with a predefined format. When a web site is initially built, an intranet portal application may build the hierarchy shown regarding blocks 1-6.

In one embodiment, block 1 may refer to a web page within a web site. The web page may be listed in a SharePoint Docs table. In one example, block 1 may be a FAQ web page. Blocks 2 and 3 may refer to corresponding web parts used to describe a view of the FAQ web page. For example, blocks 2 and 3 may correspond to a header portion, a main portion, or a tail portion of the web page. Blocks 2 and 3 may be defined in a Web Parts table. Generated globally unique identifier (GUID) values may be used to link blocks 2-3 with block 1. Block 4 may be a navigation node that includes a link, or URL, to another web page. For example, block 4 may be a navigation node to a separate home web page, a separate table of contents or menu web page, and so forth. Block 4 may be defined in a Navigation Nodes table. Blocks 5-6 may refer to lists of items, such as electronic documents, text data, spreadsheets, or otherwise. Blocks 5-6 may be defined in one or more Lists tables. Again, generated GUID values may link blocks 4-6 to block 2. Alternatively, an electronic document may be represented by block 5 or 6 and have its contents stored in a record within the SharePoint Docs table.

A sequence of steps is illustrated in FIG. 4. For purposes of discussion, the steps in this embodiment are shown in sequential order. However, some steps may occur in a different order than shown, some steps may be performed concurrently, some steps may be combined with other steps, and some steps may be absent in another embodiment. In step 1, an item represented by block 6 may qualify to be archived. In one embodiment, block 6 may correspond to an electronic document, such as a FAQ document. As described earlier, an intranet portal application 120 or a backup application 140 may base an archive qualification of an item on a corresponding age, a usage factor, a size, a combination of these characteristics, or a combination of other corresponding characteristics.

During a corresponding archiving operation in step 2, the data corresponding to block 6 may be stored in an archive store. In one embodiment, the content data of the FAQ document corresponding to block 6 is moved from a computer system 100 executing an intranet portal application 120 to an archive store. Data corresponding to other blocks within the database that have been archived may be included in the archive store. Corresponding metadata for each block in the archive store represented by block M may also be included in the archive store.

In step 3, a fixed string may be used to replace the content data in the database corresponding to the FAQ document. For example, a fixed string value of "stub", "shortcut", or other may be used to overwrite the content data in field 344 shown in FIG. 3. In one embodiment, an application programmer's interface (API) for the intranet portal application 120 may be used to perform the overwriting of the binary data content of the FAQ document in this example. In addition, a field for the data size may be changed from a size of the content data to a new value corresponding to a size of the fixed string. For example, the field 328 shown in FIG. 3 may be updated with a size of the fixed string.

As shown in FIG. 4, in one embodiment, after archiving the FAQ document and overwriting the content data with a fixed string, block 6 may now act as a placeholder for the content data. A record within the Docs table corresponding to the FAQ document no longer contains the content data of the FAQ document. However, this record acts as a placeholder for the FAQ document. In addition, the record maintains particular identification information for the FAQ document. For example, at least the original document file type, document ID and URL information may be maintained within the corresponding record. Additional identification information such as the Web ID, Site ID, List ID, Leaf Name, and so forth may also be maintained. Since the original SharePoint URL and identifiers are maintained any existing links to the document continue to function and attached workflows are also preserved. In addition, since the filename and extension are not changed an icon for the document used within the intranet portal application remains the same. As shown in FIG. 4, block 6 is represented as block SC to illustrate that block 6 is now a shortcut.

Each of the blocks 1-6 may include generated ID values. These values are shown as ID values 10-60. Although block 6 is now shown as block SC after its content is archived, its corresponding ID value 60 is maintained. The IDs 10 and 20 may correspond to a Docs ID and a Web Parts ID that may match fields only for block 2 in a Web Parts table. A URL value may be used as a unique identifier for blocks 4, 5 and 6. The URL values may correspond to a destination URL for a navigation node and URL values corresponding to storage locations for lists of items.

In a further embodiment, a separate field within the record corresponding to the FAQ document may be associated with custom properties. This field may be used to store archival information in the record. For example, referring again to FIG. 3, field 338 within record 312*n* may now store the archival information. The archival information may correspond to a portion or all of the archival identification information used by a backup server and an archive store to locate the FAQ document in the archive store. For example, an archival identifier and a saveset identifier (SSID) utilized for the archiving of the FAQ document may be stored in the corresponding record in the Docs table 310. The stored archival information in the record may be later used, such as during a retrieving request, to locate the archived copy of the FAQ document in the archive store.

In step 4, a request for the FAQ document may be received by an intranet portal application. The request may be sent from an application, such as a web browser, on a client computer. The request may be a Hypertext Transfer Protocol (HTTP) request. In order to determine whether the received request is associated with content data stored by the intranet portal application or is associated with a shortcut, some extra processing steps may be utilized. In one embodiment, the request is intercepted. For example, as is well known in the art, Microsoft's ASP.NET® is a web application framework to allow programmers to build dynamic web sites, web applications and web services. The ASP.NET application is part of a base platform for Sharepoint. Each web application framework, such as ASP.NET, allows developers to create and plug in components for enhancing Web server functionality. These enhancements may include security, user logging, and so forth. The components may act as filters and may be used to insert functionality into the request processing. One example of such a component is a HTTP Module. One or more HTTP Modules may be used to plug into an ASP.NET processing chain to handle application-wide events.

A component acting as a filter may be positioned between a Web server and a client. Each time a client conveys a request to the Web server, the request passes through the filter. Clients do not specifically target the filter in their requests. Clients convey the requests to the Web server, and the Web server passes the request to one or more filters. Filters may modify the request, perform logging operations, and so forth. The incoming request passes through one or more HTTPModules on its way to an HTTP handler. The HTTPModules are configured to inspect an incoming request and determine how to route the request. After passing through one or more specified HTTPModules, an incoming request reaches an HTTP handler. The HTTP handler performs one or more actions in order to generate an output that will be sent back to the client. For example, the client may send the request from a requesting browser.

In one embodiment, a custom component for a web application framework may be added to the intranet portal application in order to determine whether a received request from a user corresponds to a shortcut. For example, a custom HttpModule briefly described above may be added to the SharePoint Web Application. In one embodiment, the custom HttpModule may register for an HttpModule PreRequestHandlerExecute event. The PreRequestHandlerExecute event handler may determine whether the requested item is a shortcut. In one embodiment, the handler may utilize a SharePoint API to read the content of a record corresponding to the requested item, such as the requested FAQ document. This step of reading the content may be performed if the request corresponds to a particular type. For example, if the request is a retrieval type of request, such as a FrontPage Remote Procedure Call (FPRPC) request or a GET request, then the HttpModule may read the content of the corresponding record.

In one embodiment, the field 328 of a corresponding record may be checked first to determine whether the record corresponds to a shortcut. For example, the document size may be compared to a given size. The given size may be the size of a known fixed string. If the size does not equal the given size, then it may be determined the record does not correspond to a shortcut. If the document size equals the given size, then the content data is next to be checked. If the content data stored in field 344 matches the value of the fixed string that was used to overwrite the original content data, then a shortcut is detected. In one embodiment, the PreRequestHandlerExecute event handler may use the SharePoint API to inspect the value stored in field 344 of the corresponding record. It is noted that other ways of determining whether a shortcut is present are possible and are contemplated.

When a shortcut is detected, the PreRequestHandlerExecute event handler may read the archival information previously stored in the record. In step 5, this archival information may be used to locate the archived copy of the FAQ document in the archive store via the archiving system's API. In step 6, the retrieved FAQ document is sent to the requesting web browser. The original content data may be returned in an HttpResponse stream. Therefore, an application that sends a request that results in accessing a shortcut within the intranet portal application may receive the original document content. The application does not receive an indication of a shortcut. In addition, the request is not rerouted to an alternate path, such as a different URL. It may appear to the application that the original document is still in place.

Many web services utilize the Web Distributed Authoring and Versioning (WebDAV) protocol and/or the FrontPage Server Extensions Remote Procedure Call (FPRPC) protocol for manipulating file data stored in an intranet portal application such as SharePoint. Both of these protocols allow a user to access data stored in SharePoint such as via Explorer View. As is well known in the art, both of these protocols define how to set and retrieve properties on HTTP resources. In one embodiment, if the request in step 4 is a FPRPC request, then in step 6, a FPRPC header may be built prior to sending the content data to the requesting client in step 6.

In one embodiment, when Microsoft Office documents are accessed in SharePoint, the Office application may request the content data of the document from SharePoint using a FrontPage Server Extensions RPC API. Therefore, in addition to processing received requests, the custom HttpModule may also detect and handle FrontPage Server Extensions API "get document" calls. In one embodiment, the PreRequestHandlerExecute event handler may determine whether the target of the URL is a FrontPage RPC handler, such as author.dll. If this is the case, then the requested document URL may be extracted from the FrontPage request information. If the document request corresponds to a shortcut within the intranet portal application, then a FrontPage RPC response may be constructed, wherein the response contains the original document content retrieved from the archive store. Then the response may be returned to the caller.

Figure 5:
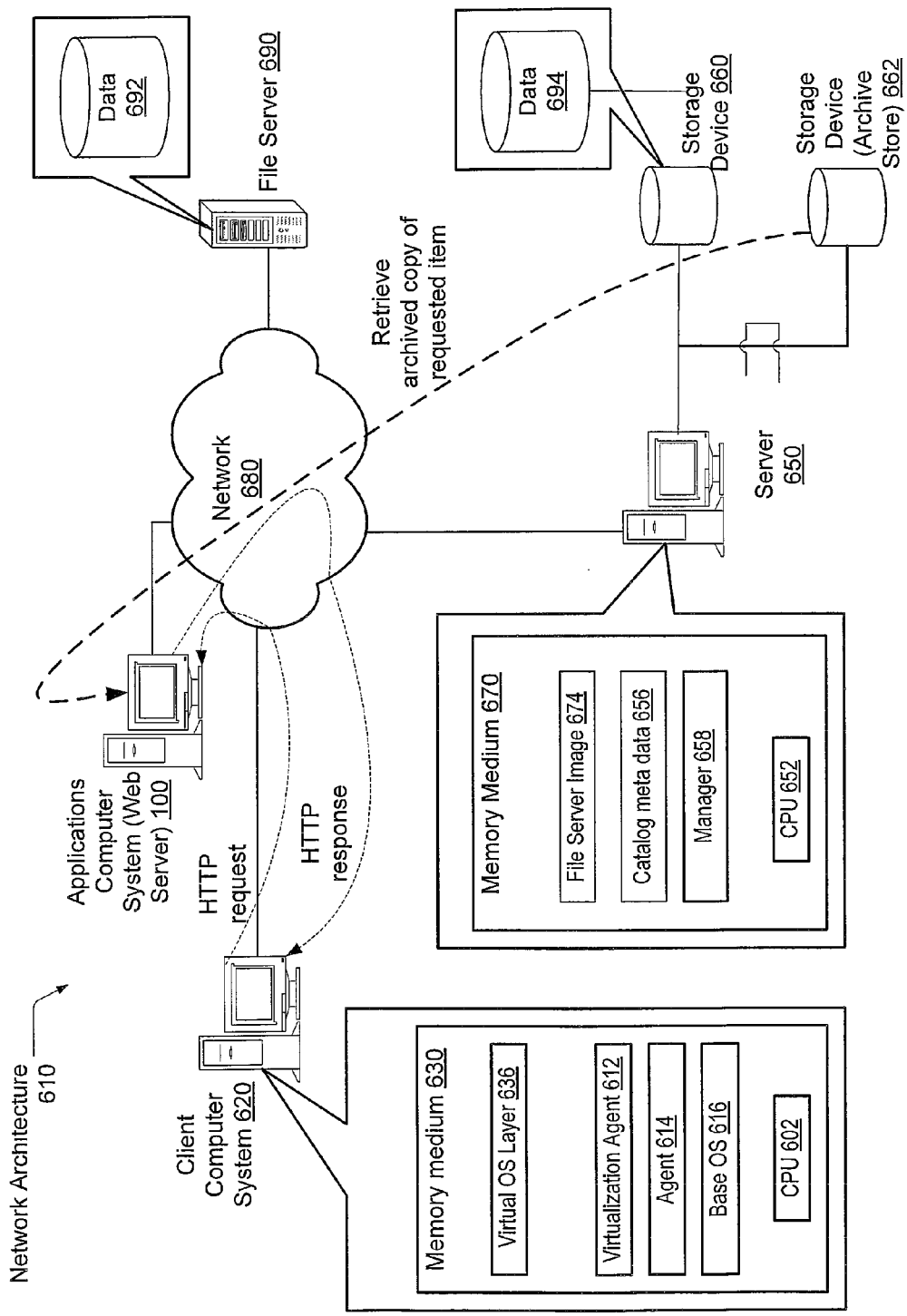
FIG. 5 is a generalized block diagram illustrating one embodiment of a network architecture.

Turning now to FIG. 5, one embodiment of a network architecture 610 is shown. Network architecture 610 includes applications computer system 100 and client computer system 620 interconnected through a network 680 to one another, to a file server 690, and to a server 650. In one embodiment, each of disk storage 660 and disk storage 662 is coupled to server 650. Disk storage 662 may be used as an archive store. Computer system 100 may generally corresponds to system 100 of FIG. 1, though not necessarily so. Computer system 100 may be used as a web server, which handles HTTP requests from applications being executed on the client computer system 620.

Network 680 may include a variety of techniques including wireless connection, direct local area network (LAN) connections, wide area network (WAN) connections such as the Internet, a router, and others. Network 680 may comprise one or more LANs that may also be wireless. Network 680 may further include remote direct memory access (RDMA) hardware and/or software, transmission control protocol/internet protocol (TCP/IP) hardware and/or software, router, repeaters, switches, grids, and/or others.

In various embodiments of network architecture 610, applications computer system 100 is representative of any number of servers hosting business-critical applications and database servers. In addition, applications computer system 100 may include one or more of the system components described both above and further described below for client 620.

Client computer system 620 is representative of any number of stationary or mobile computers such as servers, desktop PCs, laptops, handheld computers, etc. Client 620 may include at least a single processor 602 and a memory medium 630. Client 620 may use processor 602 to execute instructions of software applications. Client 620 may contain one or more software applications on its memory medium 630. For example, client 620 may include a agent 614. Similarly, client 620 may include a virtualization agent 612 for use in creating and maintaining virtual environments in the client.

In some embodiments, the systems 100 and 620 may include an operating environment, e.g. an operating system, such as base OS 616 and/or a virtual OS layer 636. In various embodiments, the provided base OS 616 may be any of various operating systems, including MS-DOS®, MS-WINDOWS®, OS/2®, UNIX®, Linux®, Solaris® or another known operating system. In some embodiments, the systems 100 and 620 have only a virtual OS layer 636 provided by an IT administrator using a common image of the layer. In other embodiments, the systems 100 and 620 have both a base OS 616 and a virtual OS layer 636. The operating system may interface between the system hardware and the software applications. One example of a software application executing on the client computer system 620 is a web browser. Other applications may be used to create and modify content on a web site supported by the computer system 100.

The file server 690 in network architecture 610 may be any kind of server configured to store data. In one embodiment, file server 690 may be a Network-Attached Storage (NAS) device. The file server 690 may be a computer specialized for providing file storage services to computer systems 100 and 620 and other information servers (not shown). The operating system and other software on the file server 690 provide the functionality of file systems, the access to files, and the management of these functionalities. The file server 690 may include one or more hard disks, often arranged into logical, redundant storage containers or RAID arrays (redundant arrays of inexpensive/independent disks). The data 692 may be stored on one or more of the hard disks of the file server 690. Files on the file server 690 may be accessed through a Network File System (NFS) interface included in network 680.

Turning now to the storage device 660, device 660 may be used to store copies of data within the network architecture 610. Data 694 may store copies of data 692, copies of data included in computer systems 100 and 620, and copies of data included in other information servers (not shown). Storage device 660 may include or be further coupled to several varieties of storage consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc. Storage device 662 may be used to store copies of data stored on device 660. Storage device 662 may comprise one or more of the memory devices listed for storage device 660. In one embodiment, when data is copied on storage device 662, corresponding content data stored on file system 690 and device 660 may be replaced with placeholder information as described earlier.

In one embodiment, the server 650 in network architecture 610 may include a application 658. This application 658, or "manager" may comprise program instructions stored on the memory medium 670 and executable by the processor 652 to perform one or more copy operations. In one embodiment, the manager 658 may create a copy of files on computer systems 100 and 620 directly without using file server 690. Such an operation may be performed to protect data on computer systems 100 and 620, which may not yet be updated on file server 690. In addition, an archiving agent within an intranet portal application executed on computer system 100 may determine when an item within a web site qualifies to be archived.

An archiving procedure for applications on computer system 100 may be performed that stores a copy of a web site on storage device 660. The web site information may include tables, records, lists of items, corresponding GUIDs, and so forth that are used to present a view of web pages within the site to a user. A agent on system 100 may generate a schema of table and index information along with the backed up contents of a database and store the generated schema to storage device 660. As used herein, "schema" refers to the data structure of a database file. In one embodiment, a database copy is a binary file that is sequentially accessed, using standard file I/O calls to the file system of the storage medium on which the binary file is stored. It is further noted that database copy may be structured in block units of memory, also referred to as pages or allocation units. The schema may then be used to access or restore the contents of database copy, without using the database. The manager 658 may create and store files in a commonly known file format, such as the Virtual Hard Disk (VHD) format, the V2I format, and the Virtual Machine Disk Format (VMDK) format. Also, proprietary file formats may be used for the storage of archive copies of files in storage device 662.

As part of creating a copy, the manager 658 may also create catalog metadata 656 associated with the corresponding files, or data objects. The catalog metadata 656 created by the manager 658 during an archive operation may include metadata for the files. In addition, metadata may be created by an archiving agent within an intranet portal application executed on computer system 100 for archive copies of files. This metadata may be included in catalog metadata 656 or placed in a separate catalog. Generally speaking, metadata may include at least one or more of the following: a data name, data size, a fingerprint of the data, a batch number, an archival identifier, a saveset identifier (SSID), as well as data type, version number, ownership, permissions, modification time, error code, etc. Other forms of metadata and/or identifiers will be apparent to those of ordinary skill in the art.

Some of the metadata described above may be sent to the applications computer system 100 when an item within a web site is archived on storage device 662. The metadata, such as the archival identifier and the saveset identifier, may be stored within a record in computer system 100 corresponding to the archived item. The metadata may be used at a later time to identify and retrieve an archived copy of the item from the data storage 662 when the client computer system 620 sends a HTTP request for the item to the computer system 100.

Figure 6:
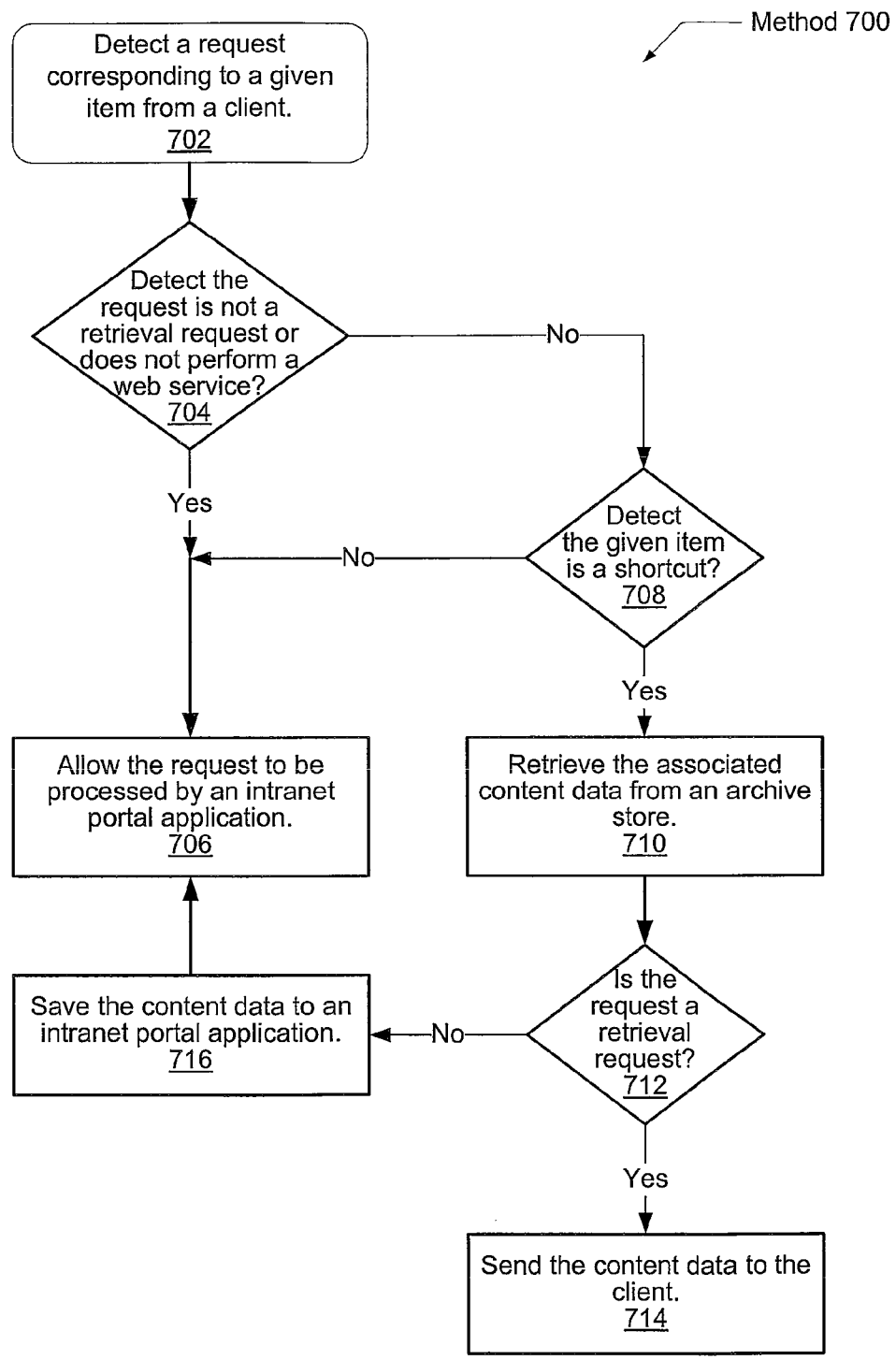
FIG. 6 is a flow diagram illustrating an embodiment of a method for handling incoming requests that may correspond to a shortcut.

It is noted in alternative embodiments, the number and type of clients, servers, and storage devices is not limited to those shown in FIG. 6. Almost any number and combination of servers, desktops, laptops, and mobile clients may be interconnected in network architecture 610 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network architecture 610.

Turning now to FIG. 6, an embodiment of a method 700 for handling incoming requests that may correspond to a shortcut is shown. The components embodied in the computer system 100, process 400 and network architecture 600 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

In block 702, a request from a client may be intercepted by the custom HttpModule described earlier. The custom HttpModule may register for an HttpModule PreRequestHandlerExecute event. The PreRequestHandlerExecute event handler may determine whether the intercepted request corresponds to a retrieval request. In addition, the event handler may determine whether the intercepted request corresponds to a web service request to be performed on an item stored in a database. The event handler may determine whether the intercepted request corresponds to other examples of requests that may depend on the location of stored content data associated with a given item.

If the event handler detect a request corresponding to the intercepted request is not a retrieval request or is not a web service request (conditional block 704), then in block 706, the custom HttpModule and any corresponding event handler may allow an intranet portal application to process the request. Otherwise, the event handler may identify a record corresponding to the intercepted request and read particular fields within the record as described earlier. These steps may be performed to determine whether a given item associated with the intercepted request corresponds to a shortcut. If the given item is a shortcut (conditional block 708), then in block 710, the associated content data for the given item may be retrieved from an archive store.

The request associated with the intercepted request may be a retrieval request, such as a HTTP GET request, a FrontPage RPC request, or other. If the request is a retrieval request (conditional block 712), then in block 714, the retrieved content data associated with the given item is sent to the client. In one embodiment, the content data is returned to the client via a HTTP response stream. In one embodiment, a FPRPC html header is built prior to sending the content data in response to the request is a FrontPage RPC request. In another embodiment, response headers are sent before sending the content data in response to the request is a HTTP GET request.

The request associated with the intercepted request may not be a retrieval request. Rather, the request may correspond to SharePoint aspx pages and web service requests. In such a case, the request may cause specific actions to be performed on documents. For example, a user may initiate an action performed by the intranet portal application on a stored item. Examples of an action may include copying or moving an item from one library to another library. This action does not return the item content to the user. However, this action may invalidate an existing shortcut. Therefore, in block 716, these operations may be trapped by the custom HttpModule. The retrieved content data may be used to overwrite the fixed string value used to denote the shortcut. Then the operation may be performed by the intranet application and act on the restored document rather than the shortcut.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for creating a shortcut for an archived item in a database, the method comprising:
    sending a request for a given item from a client computer to a web server, wherein the request comprises a location identifier for the given item;
    reading stored content data from a data location within the web server identified by said location identifier;
    determining from the stored content data that content data corresponding to the given item is not stored in the web server and is stored in an archive store;
    retrieving an archived copy of the content data corresponding to the given item from the archive store using archival identifiers stored in the data location identified by said location identifier; and
    sending the archived copy to the client computer in response to detecting the request is a retrieve request;
    in response to determining an item qualifies to be stored in the archive store:
        sending a copy of the content data corresponding to the item to the archive store for storage;
        storing in the web server archival information used for later requests to retrieve the copy of the content data from the archive store; and
        overwriting the content data with a value used to indicate the content data corresponding to the given item is not stored in the web server and is backed up in the archive store.

2. The method as recited in claim 1, further comprising intercepting the request by an HttpModule, said HttpModule performing said reading and determining.

3. The method as recited in claim 1, further comprising using the archive copy for a copy or move operation in response to detecting the request corresponds to a web service request.

4. The method as recited in claim 1, wherein said value comprises a fixed string value.

5. The method as recited in claim 1, wherein said data location is a record within a table used to describe a web site, wherein the record maintains an item identifier and the URL for the given item.

6. The method as recited in claim 5, wherein said location identifier is a uniform resource locator (URL) value in a HTTP request.

7. The method as recited in claim 1, further comprising:
    reading a stored size corresponding to the given item;
    sending said stored content data to the client computer, in response to determining the stored size is not equal to a given size; and
    inspecting said stored content data to determine whether said content data is stored in the web server or in the archive store, in response to determining the stored size is equal to the given size.

8. A computer system comprising:
    a web server;
    a client computer coupled to the web server via a network;
    an archive store coupled to the web server via the network;
    wherein the client computer is configured to send a request for a given item to the web server, wherein the request comprises a location identifier for the given item;
    wherein the web server is configured to:
        read stored content data from a data location identified by said location identifier in response to receiving the request;
        determine from the stored content data that content data corresponding to the given item is not stored in the web server and is stored in the archive store;
        retrieve an archived copy of the content data corresponding to the given item from the archive store using archival identifiers stored in the data location identified by said location identifier; and
        send the archived copy to the client computer in response to detecting the request is a retrieve request;
    wherein in response to determining an item qualifies to be stored in the archive store, the web server is configured to:
    send a copy of the content data corresponding to the item to the archive store for storage;
    store in the web server archival information used for later requests to retrieve the copy of the content data from the archive store; and
    overwrite the content data with a value used to indicate the content data corresponding to the given item is not stored in the web server and is backed up in the archive store.

9. The computer system of claim 8, wherein the web server is further configured to intercept the request by an HttpModule, said HttpModule performing said reading and determining.

10. The computer system of claim 8, wherein the web server is further configured to use the archive copy for a copy or move operation in response to detecting the request corresponds to a web service request.

11. The computer system of claim 8, wherein said value comprises a fixed string value.

12. The computer system of claim 11, wherein said data location is a record within a table used to describe a web site, wherein the record maintains an item identifier and the URL for the given item.

13. The computer system of claim 12, wherein said location identifier is a uniform resource locator (URL) value in a HTTP request.

14. The computer system of claim 11, wherein the web server is further configured to:
   read a stored size corresponding to the given item;
   send said stored content data to the client computer in response to the stored size is not equal to a given size; and
   inspect said stored content data to determine whether said content data is stored in the web server or in the archive store, in response to the stored size is equal to the given size.

15. A non-transitory storage medium storing program instructions for creating a shortcut for an archived item in a database, wherein the program instructions are executable by the processor to:
   send a request for a given item from a client computer to a web server, wherein the request comprises a location identifier for the given item;
   read stored content data from a data location within the web server identified by said location identifier;
   determine from the stored content data that content data corresponding to the given item is not stored in the web server and is stored in an archive store;
   retrieve an archived copy of the content data corresponding to the given item from the archive store using archival identifiers stored in the data location identified by said location identifier; and
   send the archived copy to the client computer in response to detecting the request is a retrieve request;
   wherein in response to determining an item qualifies to be stored in the archive store, the program instructions are executable to:
      send a copy of the content data corresponding to the item to the archive store for storage;
      store in the web server archival information used for later requests to retrieve the copy of the content data from the archive store; and
      overwrite the content data with a value used to indicate the content data corresponding to the given item is not stored in the web server and is backed up in the archive store.

16. The non-transitory storage medium of claim 15, wherein the program instructions are further executable to intercept the request by an HttpModule, said HttpModule performing said reading and determining.

17. The non-transitory storage medium of claim 16, wherein the program instructions are further executable to use the archive copy for a copy or move operation in response to detecting the request corresponds to a web service request.

18. The non-transitory storage medium of claim 15, wherein said stored content data comprises a fixed string value used to indicate the content data corresponding to the given item is not stored in the web server and is backed up in the archive store.

19. A method for creating a shortcut for an archived item in a database, the method comprising:
   sending a request for a given item from a client computer to a web server, wherein the request comprises a location identifier for the given item;
   reading stored content data from a data location within the web server identified by said location identifier;
   determining from the stored content data that content data corresponding to the given item is not stored in the web server and is stored in an archive store;
   retrieving an archived copy of the content data corresponding to the given item from the archive store using archival identifiers stored in the data location identified by said location identifier; and
   sending the archived copy to the client computer in response to detecting the request is a retrieve request;
   wherein said stored content data comprises a fixed string value used to indicate the content data corresponding to the given item is not stored in the web server and is backed up in the archive store;
   reading a stored size corresponding to the given item;
   sending said stored content data to the client computer, in response to determining the stored size is not equal to a given size; and
   inspecting said stored content data to determine whether said content data is stored in the web server or in the archive store, in response to determining the stored size is equal to the given size.

* * * * *